US005297889A

United States Patent [19]

Crouse et al.

[11] Patent Number: 5,297,889

[45] Date of Patent: * Mar. 29, 1994

[54] PACKAGING CLIP

[75] Inventors: Stephanie P. Crouse, Anderson, Ind.; Harold L. Bernard, Transfer, Pa.

[73] Assignee: R. D. Werner Co., Inc., Greenville, Pa.

[ * ] Notice: The portion of the term of this patent subsequent to Nov. 10, 2009 has been disclaimed.

[21] Appl. No.: 970,676

[22] Filed: Nov. 4, 1992

Related U.S. Application Data

[63] Continuation of Ser. No. 605,147, Oct. 29, 1990, Pat. No. 5,161,909, which is a continuation of Ser. No. 362,003, Jun. 6, 1989, abandoned.

[51] Int. Cl.[5] .......................... F16B 2/20; E06C 1/10

[52] U.S. Cl. .................................. 403/391; 403/397; 24/336; 182/178; 182/127

[58] Field of Search ............... 403/391, 397, 389, 396, 403/387; 182/178, 127; 248/229; 24/331, 329, 338, 563, 336, 288, 531, 545

[56] References Cited

U.S. PATENT DOCUMENTS

| | | | |
|---|---|---|---|
| 405,195 | 6/1889 | Ayres | 182/178 X |
| 1,398,852 | 11/1921 | Gilbert | 24/336 X |
| 3,228,640 | 1/1966 | Wolsy | 243/229 X |
| 3,231,076 | 1/1966 | Freiman | 24/336 X |
| 3,283,972 | 11/1966 | Kocina | 182/127 X |
| 3,305,904 | 2/1967 | Durate | 24/545 |
| 3,322,381 | 5/1967 | Bubb | 24/531 X |
| 3,483,996 | 12/1969 | Scammon | 24/336 X |
| 4,049,283 | 9/1977 | Brookes et al. | 182/127 X |
| 4,195,942 | 4/1980 | Kestner | 403/391 X |
| 4,226,302 | 10/1980 | Rochs | 182/178 |
| 4,352,255 | 10/1982 | Warehime | 403/391 X |
| 4,617,775 | 10/1986 | Padrun | 24/545 X |
| 4,688,961 | 8/1987 | Shioda et al. | 403/397 X |
| 4,774,792 | 10/1988 | Ballance | 403/391 X |
| 5,054,636 | 10/1991 | Netzer | 24/288 X |
| 5,161,909 | 11/1992 | Crouse et al. | 403/397 X |

FOREIGN PATENT DOCUMENTS

| | | | |
|---|---|---|---|
| 1201665 | 8/1970 | United Kingdom | 403/391 |
| 1217182 | 12/1970 | United Kingdom | 403/391 |

*Primary Examiner*—Randolph A. Reese
*Assistant Examiner*—Harry C. Kim
*Attorney, Agent, or Firm*—Ansel M. Schwartz

[57] ABSTRACT

A packaging clip for maintaining a first side rail of a ladder adjacent a second side rail of a ladder. The clip comprises a first portion for removably holding the first side rail and a second portion for removably holding the second side rail. The clip also is comprised of a support element that is disposed such that it is common with the first portion and the second portion. In a preferred embodiment, the first portion includes a first opening for removably receiving the first side rail, and the second portion includes a second opening for removably receiving the second side rail. When the first side rail is inserted into the first opening of the first portion, and the second side rail is inserted into the second opening of the second portion, the clip limits and essentially eliminates the movement of the first side rail relative to the second side rail with respect to normal forces experienced during a given application. Thus, the ladder is not damaged by the first side rail moving excessively relative to the second side rail. In an alternate application, the first side rail of a ladder is maintained by the clip adjacent a second side rail of another ladder to facilitate transportation of the ladders.

26 Claims, 2 Drawing Sheets

PACKAGING CLIP

This is a continuation of co-pending patent application Ser. No. 07/605,147 filed on Oct. 29, 1990, now U.S. Pat. No. 5,161,909, patent application Ser. No. 07/362,003 filed on Jun. 6, 1989, now abandoned.

FIELD OF THE INVENTION

The present invention relates to a packaging clip for ladders. More specifically, the present invention relates to a packaging clip for maintaining a first side rail of a ladder adjacent a second side rail of a ladder.

BACKGROUND OF THE INVENTION

Ladders have become a common tool to enable people to reach locations that would otherwise be too high off the ground. One type of ladder, otherwise known as a stepladder, essentially forms an inverted V when in place. This inverted V shape allows the ladder to be self-supporting, with the weight of the ladder and the weight of anything on the ladder being distributed about the bottom ends of the four side rails that comprise the ladder.

However, because of this ability of the ladder to fold together for storage purposes, there is also present the problem of the two sets of side rails moving sideways (rather than toward or away from each other) relative to each other about the joint at the top of the ladder. Since the joint is designed to function in a forward or back motion with respect to the two sets of side rails, any side motion experienced by the joint is injurious to it. Over time, this abuse can loosen the joint with respect to its ability to hold the sets of side rails from moving in a sideways motion. In addition, the movement of the side rails relative to each other can also cause damage to the rails themselves if they contact each other during their relative movement.

One type of clamp that has been used to hold the side rails adjacent each other is in the form of a C, with the C formed of three straight portions and having hooks at each end of the C. The hooks fit about the adjacent side rails and attempt to prevent sideways motion of the side rails during shipping. While this C clip seems to limit sideways motion of the side rails, it does not provide the ability to maintain the side rails of two different ladders adjacent, for instance, for stacking and storage purposes during shipping.

SUMMARY OF THE INVENTION

The present invention pertains to a packaging clip for maintaining a first side rail of a ladder adjacent a second side rail of a ladder. The clip comprises a first portion for removably holding the first side rail and a second portion for removably holding the second side rail. The clip also is comprised of a support element that is disposed such that it is common with the first portion and the second portion.

In a preferred embodiment, the first portion includes a first opening for removably receiving the first side rail, and the second portion includes a second opening for removably receiving the second side rail.

When the first side rail is inserted into the first opening of the first portion, and the second side rail is inserted into the second opening of the second portion, the clip limits and essentially eliminates the movement of the first side rail relative to the second side rail with respect to normal forces experienced during a given application. Thus, the ladder is not damaged-by the first side rail moving excessively relative to the second side rail. In an alternate application, the first side rail of a ladder is maintained by the clip adjacent a second side rail of another ladder to facilitate transportation of the ladders.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
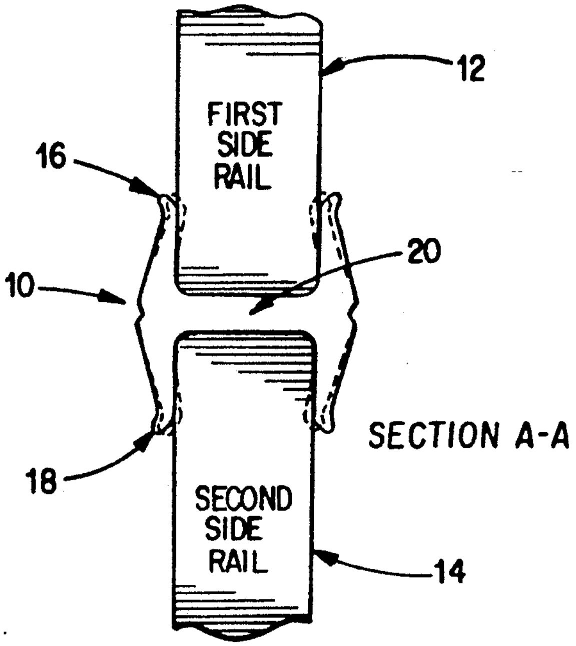
FIG. 1 is a side view of a first embodiment of a packaging clip for maintaining a first side rail of a ladder adjacent a second side rail of a ladder.
Figure 2:
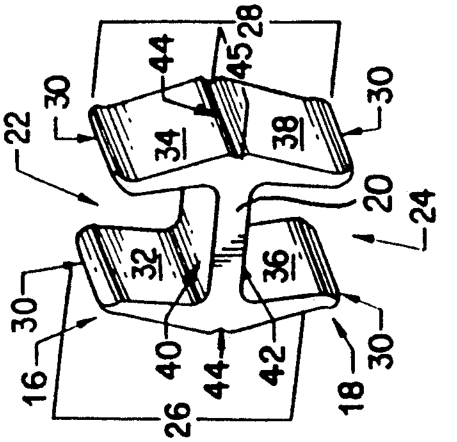
FIG. 2 is a perspective view of a first embodiment of the clip for maintaining a first side rail of a ladder adjacent a second side rail of a ladder.
Figure 3:
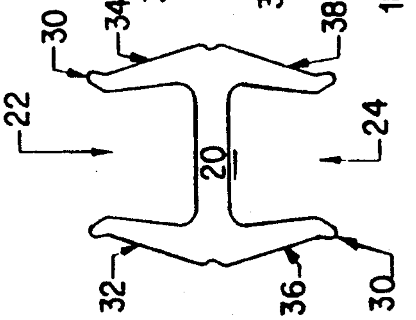
FIG. 3 is a side view of the first embodiment of the clip.

Referring now to the drawings wherein like reference numerals refer to similar or identical parts throughout the several views, and more specifically to FIG. 1 thereof, there is shown a side view of a packaging clip 10 for maintaining a first side rail 12 of a ladder adjacent a second side rail 14 of a ladder. The clip 10 is comprised of a first portion 16 for removably holding the first side rail 12 and a second portion 18 for removably holding the second side rail 14. The clip 10 also includes a support element 20 that is disposed such that it is common with the first portion 16 and second portion 18. Preferably, the first portion 16 includes a first opening 22 for removably receiving the first side rail 12, and the second portion 18 includes a second opening 24 for removably receiving the second side rail 14 as is shown in FIGS. 2 and 3.

The clip 10, in one embodiment, includes a first element. 26 connected to the support element 20 and a second element 28 connected to the support element 20 and maintained in spatial relationship from said first element 26 by said support element 20. The support element 20 maintains the first portion 16 in spatial relationship with the second portion 18.

The first element 26 and the second element 28 are preferably disposed essentially in parallel, and the support element 20 is disposed essentially perpendicular to the first element 26 and second element 28. Preferably, the ends 30 of the first element 26 and the second element 28 are flanged outward from the first opening 22 and second opening 24, respectively, to facilitate receipt of the first side rail 12 and second side rail 14, respectively.

The first element 26 and the second element 28 are preferably divided into a first leg 32, second leg 34, third leg 36 and fourth leg 38 by the support element 20. The first portion 16 includes the first leg 32 and second leg 34, and the second portion 18 includes the third leg 36 and the fourth leg 38. Each leg is between ¼" and 4' long, between 1/16" and ½" thick and between ¼" and 12" wide. Preferably, each leg is approximately 0.609" long, approximately 0.75" wide, and approximately 0.225" thick. The support element 20 is between ¾" and 3" long, between 1/16" and 12" wide, and between 1/16" and 4" thick. Preferably, the support element 20 is approximately 1.15" long, approximately 0.75" wide, and approximately 0.188" thick. The dimensions of the legs and support member are dictated by the size of the side rails which are to be maintained adjacent. The first and second openings 22, 24 of the first and second portions 16, 18, which are defined by the legs and support member 20, are preferably of a size that receive the first and second side rails 12, 14, respectively, and then hold them without slippage under a load of at least their own weight.

Preferably, the legs are angled inward toward the respective opening. By being angled inward, more force is applied by each leg to the respective side rail upon receipt thereof in the respective portion since the leg desires to return to its prestressed position but cannot because the respective side rail is in the respective openings. See FIG. 1, which shows the legs about the respective rails, and the legs in their normal position as represented by the dotted lines.

The legs and the support element 20 preferably form essentially an H shape and are one continuous piece of molded plastic although the clip can be made from any material that can be molded, extruded or machined. The material out of which the clip 10 is formed should be rigid enough to withstand the normal lateral forces experienced during a given application without significantly bending, but elastic enough to receive and form fit with the respective side rails 12, 14, as described above.

In an alternative embodiment, the first portion 16 includes the first leg 32 and the second leg 34 which extend essentially perpendicular from the support member 20 on a first side 40 thereof. The second portion 18 includes the third leg 36 and the fourth leg 38 which extend essentially perpendicular from the support member 20 on a second side 42 thereof. The first leg 32, the second leg 34 and the first side 40 of the support element 20 define the first opening 22. The third leg 36, the fourth leg 38 and the second side 42 of the support element 20 define the second opening 24.

Figure 4:
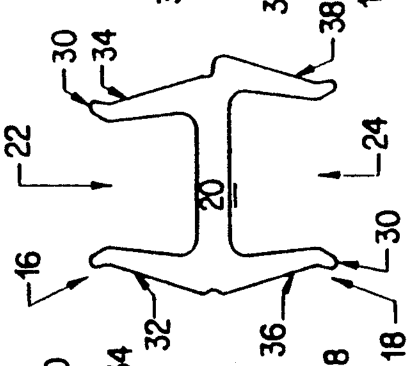
FIG. 4 is a side view of a second embodiment of the clip.
Figure 5:
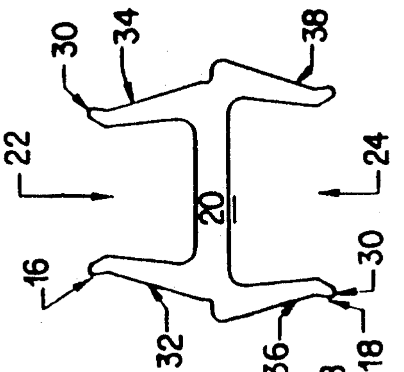
FIG. 5 is a side view of a third embodiment of the clip.

In another alternative embodiment of the clip 10, the second portion 18 can be offset from the first portion 16, as shown in FIG. 4 with the first and second openings being of a different size. In another embodiment, the first opening 22 of the first portion 16 can be of a different size than the second opening 24 of the second portion 18 but not offset, as shown in FIG. 5. Preferably, the ends 30 of the first and second legs 32, 34 and the ends 30 of the third and fourth legs 36, 38 are flanged outward away from the first and second openings 20, 22, respectively. for the same reasons as described above. The legs and the support element 20 are preferably one continuous piece formed of molded plastic with the same constraints thereon as described above. In both of the embodiments described above, the external surface 44 of the support element 20 preferably has grooves 46 along the entire width to aid in gripping the clip 10.

Figure 6:
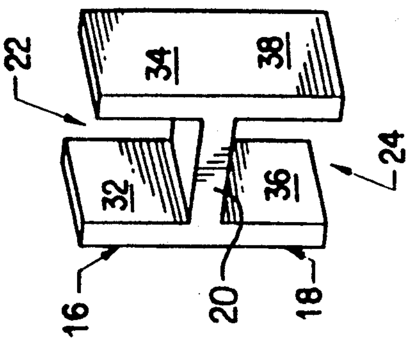
FIG. 6 is a perspective view of a fourth embodiment of the clip.
Figure 7:
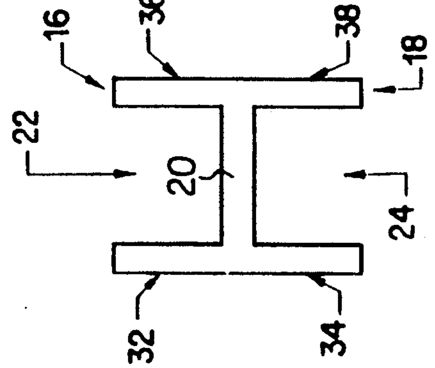
FIG. 7 is a side view of the fourth embodiment of the clip.
Figure 8:
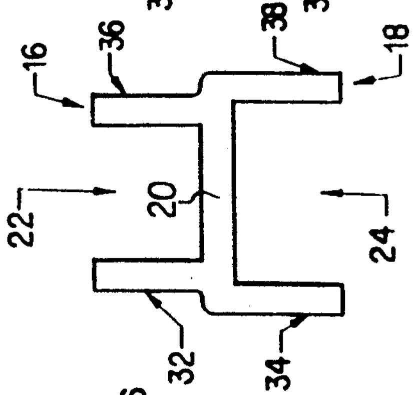
FIG. 8 is a side view of a fifth embodiment of the clip.
Figure 9:
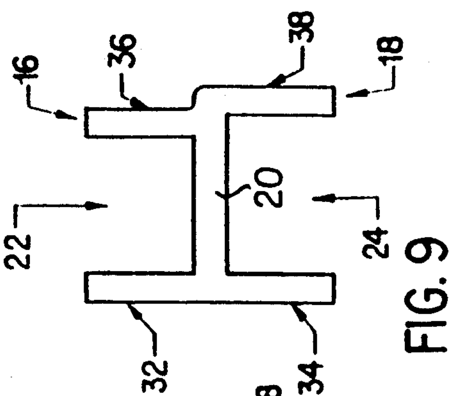
FIG. 9 is a side view of a sixth embodiment of the clip.

In additional alternative embodiments, the clip 10 can be without flanges or grooves and the legs are not angled, as shown in FIGS. 6–9. FIGS. 6 and 7 are perspective and side views, respectively of a clip 10 wherein the first and second openings are essentially of the same size. FIG. 8 is a side view of the clip 10 wherein the first opening 22 is of a different size than the second opening 24. FIG. 9 is a side view of the clip 10 wherein the second opening 24 is offset from the fist opening 22.

Figure 10:
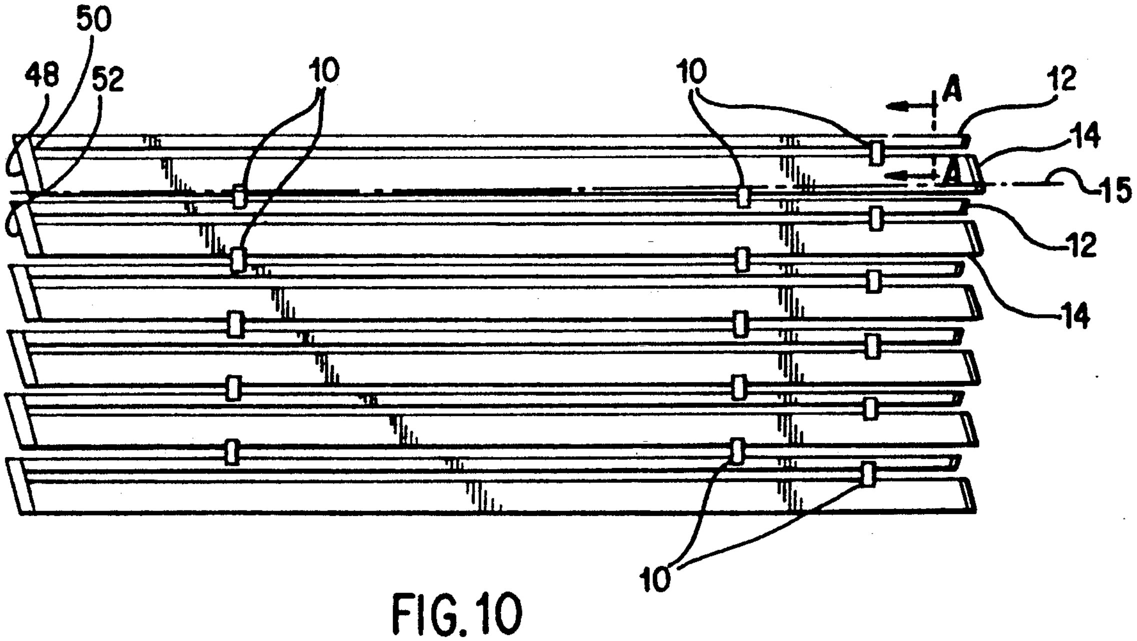
FIG. 10 is a side view of a plurality of ladders maintained together by the clip.

In the operation of the invention, the first side rail 12 of ladder 48 is received by the first portion 16 of clip 10 through the first opening 22 and held thereby, as shown in FIG. 10 and FIG. 1 (FIG. 1 is a cross-sectional view along section A—A of FIG. 10) . The second side rail 14 of ladder 48 is received by the second portion 18 of clip 10 through the second opening 24 and held thereby. The flanged ends 30 of the legs of the respective portions facilitate the receipt of the side rails into the respective openings. The legs themselves, which are angled inward toward the respective opening, are moved apart as the respective portion receives the respective side rail. The legs move until they form fit with the respective side rail, and hold the respective side rail by having corresponding legs (first leg 32 and second leg 34, and third leg 36 and fourth leg 38) essentially clamp about the respective side rail.

With the clip in place, the first and second side rails of the ladder 48 are maintained adjacent each other. Movement therebetween is then limited such that no damage is possible to the ladder 48 by relative movement of the rails about the ladder end 50 under normal forces experienced in a given application.

Two or more ladders can also be stacked atop each other with the use of the clip 10. In such an application, the second side rail 14 of a first ladder 48, for instance, and a first side rail 12 of a second ladder 52 are received in the respective portions of an clip 10 as described above. Preferably, two clips 10 positioned near opposite ends of the side rails are used to maintain two ladders adjacent each other. Additionally, ladders can be stacked together by repeating the use of the clips 10 with respect to each additional ladder that is to be added to ladders which have already been connected together in the aforementioned manner.

Although the invention has been described in detail in the foregoing for the purpose of illustration, it is to be understood that such detail is solely for that purpose and that variations can be made therein by those skilled in the art without departing from the spirit and scope of the invention as described by the following claims.

What is claimed is:

1. A clip for maintaining a first side rail of a stepladder adjacent to a second side rail of a stepladder which is in series with the first side rail comprising:

a first portion connected to a support element and a second portion connected to the support element, said first portion, second portion and support element are one continuous piece, said first and second portions define first and second essentially rectangular-shaped inner surfaces opening from opposite sides of said support element, respectively, which conform to the portion of the respective side rail that it receives for removably and frictionally holding the respective side rails in a self-gripping and form-fitting manner such that the side rails are maintained adjacent and in series to each other so that no damage is possible to the ladder by relative movement of the side rails under dynamic conditions brought about by motion during transportation.

2. A clip as described in claim 1 including a first element connected to the support element and a second element connected to the support element in parallel with the first element and maintained in spatial relationship from said first element by said support element, said first element, second element and support element defining the first and second portions.

3. A clip as described in claim 2 wherein the first element and the second element are divided into a first, second, third and fourth leg by the support element, with the first portion including the first and second legs, and the second portion including the third and fourth legs.

4. A clip as described in claim 3 wherein the legs and the support element are formed of molded plastic.

5. A clip as described in claim 2 wherein the second portion is offset from the first portion.

6. A clip as described in claim 5 wherein the ends of the first and second elements are flanged outward away from the first and second openings, respectively.

7. A method for securely transporting a stepladder which defines a plane for climbing comprising the steps of:

inserting a first side rail of the ladder into a first portion of a clip such that the first side rail is removably held thereby and a second portion of the clip extends from the first side rail essentially perpendicular to the climbing plane of the ladder;

inserting a second side rail of the ladder into the second portion of the clip such that the second side rail is removably held thereby; said second portion and said first portion having a common support element; and transporting the ladder, said first and second portions, respectively, define first and second essentially rectangular-shaped inner surfaces opening from opposite sides of said support element, respectively, which conform to the portion of the respective side rail that it receives for removably and frictionally holding the side rails, with the clip holding and maintaining the first and second side rails adjacent to each other so that no damage is possible to the ladder by relative movement of the side rails under dynamic conditions brought about by motion during transportation.

8. A method as described in claim 7 wherein the first and second inner surfaces hold the respective side rails in a self gripping and form-fitting manner.

9. A method as described in claim 8 wherein the first portion includes a first opening for removably receiving the first side rail, and the second portion includes a second opening for removably receiving the second side rail.

10. A method as described in claim 9 including a first element connected to the support element and a second element connected to the support element and maintained in spatial relationship from said first element by said support element.

11. A method as described in claim 10 wherein the support element maintains the first portion in spatial relationship with the second portion.

12. A method as described in claim 11 wherein the first element and the second element are disposed essentially in parallel and the support element is disposed essentially perpendicular to the first element and second element.

13. A method as described in claim 12 wherein the ends of the first element and the second element are flanged outward from the first opening and second opening respectively to facilitate receipt thereby of the first rail and second side rail, respectively.

14. A method as described in claim 13 wherein the first element and the second element are divided into a first, second, third and fourth leg by the support element, with the first portion including the first and second legs, and the second portion including the third and fourth legs.

15. A method as described in claim 14 wherein each leg is between ¼"–4" long, between 1/16"–½" thick and between ¼"–12" wide; and the support element is between ¾"–3" long, between 1/10"–12" wide, and between 1/16"–4" thick.

16. A method as described in claim 15 wherein the legs and the support element form essentially an H shape.

17. A method as described in claim 16 wherein the legs and the support element are one continuous piece formed of molded plastic.

18. A method as described in claim 17 wherein the external surface of the support element has grooves to aid in gripping the clip.

19. A method as described in claim 9 wherein the first portion includes a first leg and a second leg which extend essentially perpendicular from the support element on a first side thereof, and the second portion includes a third leg and a fourth leg which extend essentially perpendicular from the support element on a second side thereof.

20. A method as described in claim 19 wherein the first leg, the second leg, and the first side of the support element define the first opening; and the third leg, the fourth leg and the second side of the support element define the second opening.

21. A method as described in claim 20 wherein the second portion is offset from the first portion.

22. A method as described in claim 21 wherein the legs and the support element are one continuous piece formed of molded plastic.

23. A method for securely transporting a first ladder which defines a first plane for climbing and at least a second ladder which defines a second plane for climbing comprising the steps of:

inserting a first side rail of the first ladder into a first portion of a first clip such that the first side rail of the first ladder is removably held thereby and a second portion of the first clip extends from the first side rail essentially perpendicular to the climbing plane of the ladder;

inserting a second side rail of the first ladder into the second portion of the first clip such that the second side rail of the first ladder is removably held thereby, said second portion and said first portion of said first clip having a common support element, said first and second portions, respectively, define first and second essentially rectangular-shaped inner surfaces opening from opposite sides of said support element, respectively, which conform to the portion of the respective side rail that it receives for removably and frictionally holding the side rails;

inserting a first side rail of a second ladder into a first portion of a second clip such that the first side rail of the second ladder is removably held thereby and a second portion of the second clip extends from the first side rail of the second ladder essentially perpendicular to the climbing plane of the ladder;

inserting a second side rail of the second ladder into the second portion of the second clip such that the second side rail of the second ladder is removably held thereby, said second portion and said first portion of said second clip having a common support element, said first and second portions of the second clip, respectively, define first and second essentially rectangular-shaped inner surfaces opening from opposite sides of said support element of the second chip, respectively, which conform to the portion of the respective side rail that it receives for removably and frictionally holding the side rails;

inserting the first side rail of the first ladder into a first portion of a third clip such that the first side rail of the first ladder is removably held thereby and a second portion of the third clip extends from the first side rail of the first ladder essentially perpendicular to the climbing plane of the ladder;

inserting the second side rail of the second ladder into the second portion of the third clip such that the second side rail of the second ladder is removably held thereby, said second portion and said first portion of said third clip having a common support element, said first and second portions of said third chip, respectively, define first and second essentially rectangular-shaped inner surfaces opening from opposite sides of said support element, respectively, which conform to the portion of the respective side rail that it receives for removably and frictionally holding the side rails; and moving the ladders, with the clips holding and maintaining the first and second rails adjacent to each other so that no damage is possible to the ladders by relative movement of the rails and the ladders are maintained adjacent each other while the ladders are being transported.

24. A method as described in claim 23 wherein the first and second inner surfaces hold the respective side rails in a self gripping and form-fitting manner.

25. A method for binding together and securely transporting under dynamic conditions a first ladder which defines a first plane for climbing and at least a second ladder which defines a second plane for climbing comprising the steps of:

inserting a first side rail of the first ladder into a first portion of a first H shaped clip such that the first side rail of the first ladder is removably held thereby and a second portion of the clip extends from the first side rail essentially perpendicular to the first climbing plane;

inserting a second side rail of the first ladder into a first portion of a second H shaped clip such that the second side rail of the first ladder is removably held thereby and a second portion of the second clip extends from the second side rail of the first ladder perpendicular to the first climbing plane;

inserting a first and second side rail of a second ladder into the first and second portions, respectively, of the first and second clips such that the first and second side rails of the second ladder are removably held thereby and the first and second climbing planes are disposed in a parallel relationship, said first portion and second portion of each of said clips having a common support element, said first and second portions, respectively, define first and second essentially rectangular-shaped inner surfaces opening from opposite sides of said support element, respectively, which conform to the portion of the respective side rail that it receives for removably and frictionally holding the side rails; and transporting the ladders, with the clips holding and maintaining the side rails of the first and second ladders adjacent and in series to each other so that no damage is possible to the side rails by dynamic movement of the ladders and the ladders are maintained adjacent and in series to each other while the ladders are being moved under normal conditions.

26. A method as described in claim 25 wherein the first and second inner surfaces hold the respective side rails in a self gripping and form-fitting manner.

* * * * *